March 14, 1939.   J. D. BIGGERS   2,150,355
MULTIPLE GLASS SHEET GLAZING CONSTRUCTION
Filed Sept. 19, 1935
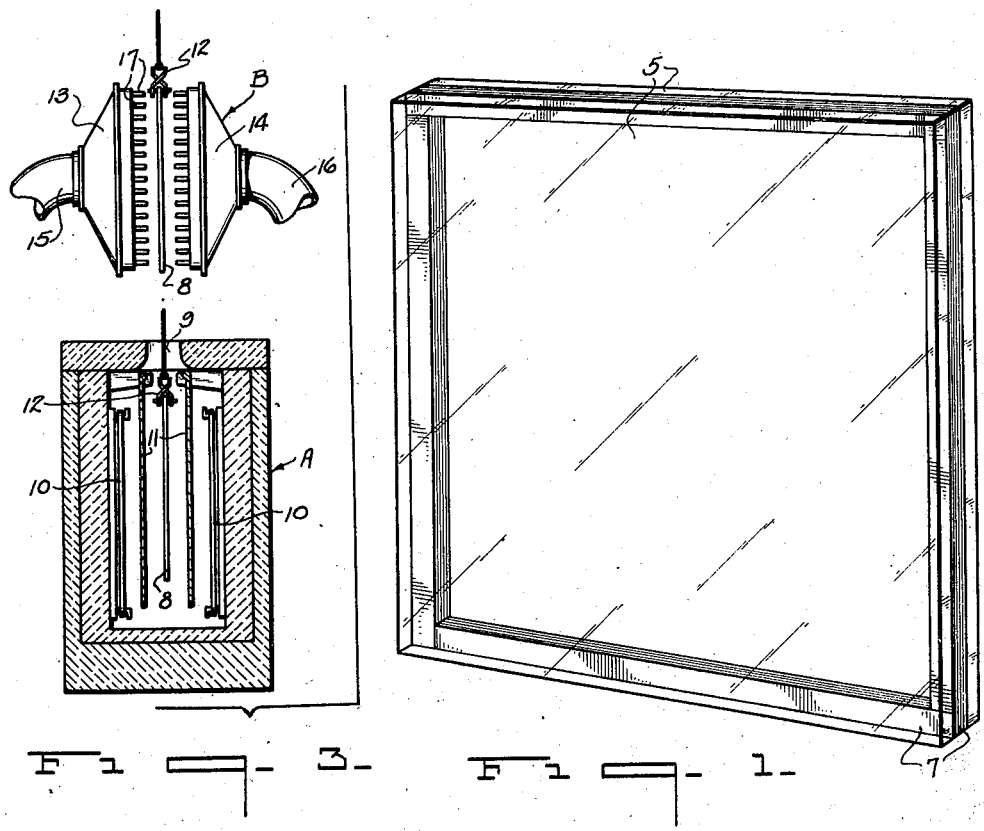
Inventor
JOHN D. BIGGERS.
By Frank Fraser
Attorney Patented Mar. 14, 1939

2,150,355

UNITED STATES PATENT OFFICE 2,150,355

MULTIPLE GLASS SHEET GLAZING CONSTRUCTION

John D. Biggers, Toledo, Ohio, assignor to Libbey-Owens-Ford Glass Company, Toledo, Ohio, a corporation of Ohio Application September 19, 1935, Serial No. 41,269

3 Claims. (Cl. 20—56.5)

The present invention relates to an improved multiple glass sheet glazing construction.

The general type of glazing construction to which this invention appertains consists of two or more sheets of glass arranged in parallel and maintained in spaced relation by separator means positioned between and secured to the said sheets around the perimeters thereof. The separator means usually resorted to comprises a plurality of separator or spacer strips completely surrounding the marginal portions of the glass sheets and suitably secured thereto such as for example by means of a suitable adhesive or cement applied to the strips and/or glass. The separator means constitutes in effect a seal which hermetically seals the space between the glass sheets to provide an air-tight chamber. This space or chamber between the sheets may be filled with dehydrated air or exhausted to provide a partial vacuum.

The use of double glazing has long been desirable wherever it is important to reduce heat transfer and to prevent condensation of moisture upon glass in glazed openings. Thus, it has the effect of greatly retarding the escape of heat therethrough from the inside of a building during the winter as well as minimizing the passage of heat into the building from the outside during the summer. This is due to the fact that the air-tight space between the glass sheets (whether filled with air or exhausted to create a partial vacuum) is an exceedingly poor conductor of heat, so that a double glazed window possesses much greater insulating properties than a single sheet or pane of glass.

The glass sheets used in double glazing may be either plate glass or window glass; plate glass differing from window glass in that its opposite surfaces are ground and polished to render them plane and optically true. From a cost standpoint, it is preferred to use ordinary plate and point glass made from well known soda-lime batches. Such plate and window glass, when used in an installation where both sides thereof are freely exposed to the atmosphere, will give satisfactory service from a weathering standpoint for a long period of years. However, it has been found that as a rule when plate and window glass is installed in such a way that both surfaces thereof are not exposed to the atmosphere, such unexposed surfaces become stained or effloresce. This staining, fading, or efflorescing of the glass on the interior of a double sash glazing construction has been one of the principal obstacles standing in the way of commercial success of this type of glass unit.

The aim of this invention is the provision of a multiple glass sheet glazing unit of increased strength and durability and embodying glass sheets which have been specially treated in a manner to greatly increase the resistance thereof to shock and sudden changes of temperature as well as rendering them more resistant to weathering (i. e., staining, fading, and efflorescing).

Briefly stated, the present invention contemplates the use of specially treated tempered plates in the fabrication of the multiple glazing unit. The tempering of the glass not only greatly increases its mechanical strength and resistance to blows but also renders it more resistant to sudden changes in temperature. Furthermore, the treatment of the glass sheets so modifies the surface composition thereof that the tendency toward weathering is materially reduced. In the tempering of the glass sheets, the said sheets are first heated to approximately the point of softening of the glass and then suddenly chilled to place the outer surfaces of the sheets under compression and the interiors thereof under tension. Glass sheets thus treated are materially stronger than ordinary glass and when broken will disintegrate into innumerable small and relatively harmless particles so that in the event of breakage the formation of dangerous splinters is avoided.

Other objects and advantages of the invention will become more apparent during the course of the following description when taken in connection with the accompanying drawing.

In the drawing wherein like numerals are employed to designate like parts throughout the same, Fig. 1 is a perspective view of a multiple glass sheet glazing unit constructed in accordance with the present invention, Fig. 2 is a transverse sectional view thereof, and Fig. 3 is a view showing one form of tempering apparatus which may be employed in carrying out the invention.

Referring to the drawing, there is illustrated in Figs. 1 and 2 a multiple glass sheet glazing unit including the two sheets of glass 5, 5 arranged face to face but slightly spaced from one another to provide an air space 6 therebetween. The glass sheets are maintained in predetermined spaced relation by a plurality of separator strips 7 arranged between the said sheets entirely around the marginal portions thereof. As here shown, the separator strips are positioned substantially flush with the edges of the glass sheets and are adapted to be suitably bonded thereto in a manner to hermetically seal the space 6 and render it air-tight. This space is preferably filled with dehydrated air, although it may be exhausted to create a partial vacuum if desired.

The separator strips 7 may be formed of any suitable material such as rubber or rubber composition, cork, felt, wood, etc., and secured to the glass sheets by means of any suitable cement or adhesive. If preferred, the separator strips may be formed of a "self-bonding plastic" or, in other words, a plastic of such a character that it is naturally adherent toward glass and will readily adhere thereto when subjected to a slight pressure in the presence of heat. When using a self-bonding plastic material, it is not necessary that any additional adhesive or cement be used between the separator strips and glass sheets. Certain synthetic resins have been found to work satisfactorily for this purpose such as, for example, vinyl acetate of different viscosities and different degrees of plasticization, polymerized esters of acrylic acid, and polymerized esters of methacrylic acid or mixtures of these two resins; also the poly styrols and poly acrylate esters when properly plasticized.

As brought out above, this invention comprehends the use of specially treated glass in the making of the glazing unit. According to the invention, the glass sheets are tempered by first heating the said sheets approximately to the point of softening of the glass, after which they are suddenly chilled to place the outer surfaces of the sheets under compression and the interiors thereof under tension. The tempering of the glass may be carried out by any well known method, and by way of example there is illustrated in Fig. 3 of the drawing one form of apparatus which may be used. This apparatus comprises a furnace A within which the glass sheets are adapted to be heated, while the means for subsequently chilling or cooling the sheets is designated generally by the letter B. The cooling means B is here shown as being arranged directly above the furnace A so that the glass sheet 8, after being heated within the furnace, can be transferred directly to the cooling means without any undue loss of heat and without being adversely affected by atmospheric conditions during the transfer.

The furnace A is preferably of the electrically heated type and is provided with a top opening 9 through which the glass sheet 8 to be treated may be inserted and removed. Any suitable covering can be used for the opening 9 as will be readily understood. For the purpose of heating the furnace, electrical heating elements 10 may be used in conjunction with baffle plates 11 and by means of any conventional indicating and control mechanism, the temperature of the furnace can be regulated to heat the glass sheet 8 to approximately its point of softening, which is ordinarily in the neighborhood of 1250 degrees Fahrenheit for flat glass. The glass sheet may be suspended within the furnace from a plurality of relatively small hooks or tongs 12 engaging the said sheet near its upper edge.

When the glass sheet has been heated to the desired temperature, it is lifted from the furnace through the top opening 9 and subjected immediately to the action of the cooling means B, said means comprising spaced blower heads 13 and 14 connected by flexible conduits 15 and 16 respectively to suitable blowers (not shown) so that blasts of air can be directed simultaneously upon opposite surfaces of the glass sheet when brought into position between the said blower heads. Each blower head may be provided with a plurality of nipples 17 through which jets of air are directed against the sheet.

It will of course be appreciated that this invention is not limited either to the specific type of means herein disclosed for heating the glass sheets or the particular means disclosed for cooling the same.

The heating of the glass sheets to approximately the point of softening of the glass and the sudden chilling thereof in the manner explained above results in the tempering of the glass in such a manner that it possesses considerably greater mechanical strength as well as greatly increased resistance to blows and sudden changes in temperature than it possessed prior to such treatment. Moreover, this treatment so modifies the breaking characteristics of the glass that when broken, the sheet will disintegrate into innumerable small and relatively harmless particles. These characteristics render this particular type of glass exceedingly desirable for use in the manufacture of multiple glazing units and especially when the unit is to be installed in a metal sash where it is ordinarily subjected to a greater strain than when mounted in a wooden sash. Manifestly, if one pane of a double sash unit is broken, the entire unit must be replaced. Consequently, it is highly desirable that the unit possess the greatest possible mechanical strength and maximum resistance to fracture. The use of tempered glass in the fabrication of the glazing unit will give it added strength and resistance to blows so that the danger of breakage will be materially reduced. The increased resistance of the tempered glass to sudden changes in temperature is also of decided advantage in double sash glazing.

Another very important advantage to be gained by the use of tempered glass sheets is that they are less susceptible to weathering than sheets of ordinary glass and particularly those made from well known soda-lime batches. As a rule, when sheets of ordinary glass are used in double glazing, the inner surfaces thereof which are not exposed to the atmosphere become stained or effloresce. It will of course be appreciated that in double sash glazing units, the inner surfaces of the glass sheets are not accessible for cleaning so that upon staining, fading, or efflorescing, the appearance and transparency of the unit may be permanently impaired. However, by tempering the glass sheets, the tendency toward weathering is materially lessened. Tests tend to show that this is due to the fact that the heating and subsequent cooling of the glass sheet causes a change in the surface composition thereof. In glass made from soda-lime batches, soda ash is one of the principal constituents and it is well established that the chemical durability of the glass increases with decreased soda content. Soda ash comprises a relatively high percentage of alkali and during the heating of the glass sheets, the alkali tends to volatilize from the surfaces of the glass sheets, with the result that the surfaces of the sheets are deficient in alkali as compared with the main body. This decreased alkaline content will greatly increase the chemical durability of the glass, rendering it more resistant to staining, fading and efflorescing. The use of glass sheets of such character that the inner surfaces thereof will not stain or effloresce is obviously highly desirable in that it overcomes one of the principal obstacles standing in the way of commercial success of this type of glazing unit.

While there has been illustrated in the drawing a glazing unit including but two sheets of glass, it will be understood that the invention contemplates the provision of units comprising three or more sheets. Also, while it is preferred that all of the glass sheets of the glazing unit be of tempered glass, one or more of the sheets may be of tempered glass and the remaining sheet or sheets of ordinary glass if desired.

I claim:

1. A multi-ply glass sheet glazing construction comprising a plurality of spaced sheets of tempered glass, and separator means between the edges of said sheets extending around their perimeters.

2. A multi-ply glass sheet glazing construction comprising a plurality of spaced sheets of glass, the surface composition of which is different from that of the body thereof to reduce the tendency of the sheets toward weathering, and separator means between the edges of said sheets extending around their perimeters.

3. A multi-ply glass sheet glazing construction comprising a plurality of spaced sheets of glass made from soda lime batches and the surfaces of which are deficient in alkali as compared with the bodies thereof, and separator means between the edges of said sheets extending around their perimeters.

JOHN D. BIGGERS.